United States Patent
Tonkin

[15] 3,685,770
[45] Aug. 22, 1972

[54] DAMPERS FOR SPINNING BODIES

[72] Inventor: Stephen William Tonkin, Bristol, England

[73] Assignee: British Aircraft Corporation, Limited, London, England

[22] Filed: March 3, 1971

[21] Appl. No.: 120,451

[52] U.S. Cl. .................................244/1 SA, 74/5.5
[51] Int. Cl. ....................B64c 17/06, G01c 19/04
[58] Field of Search..........................................74/5.5; 188/316–317; 244/1 SS, 1 SA, 3.21, 3.23

[56] References Cited

UNITED STATES PATENTS

| | | | |
|---|---|---|---|
| 2,520,929 | 9/1950 | Hammond, Jr. | 74/5.5 |
| 3,397,851 | 8/1968 | McNutt | 74/5.5 X |
| 3,442,468 | 5/1969 | Iorillo | 244/1 SA |
| 3,511,452 | 5/1970 | Smith et al. | 74/5.5 X |

*Primary Examiner*—Milton Buchler
*Assistant Examiner*—Stephen G. Kunin
*Attorney*—Cushman, Darby & Cushman

[57] ABSTRACT

A damper for damping nutational movements of a spinning spacecraft, the damper comprising an outer body which is mounted eccentrically on a spinning part of the spacecraft, and a gyro flywheel rotated at high-speed in the body to provide a reaction member. The gyro flywheel is gimbal-mounted in the outer body for relative tilting in any direction, and is enclosed in an inner casing containing damping liquid by which relative tilting movements between the outer body and the flywheel are damped. In another arrangement the flywheel comprises a quantity of free liquid contained in an inner annular housing journalled in the outer body and motor-driven at high rotational speed. The liquid is rotated by the frictional drag of the inner housing in the form of an annular liquid flywheel which has a self-damping action on tilting movements of the outer body and inner housing.

13 Claims, 3 Drawing Figures

PATENTED AUG 22 1972   3,685,770

INVENTOR
STEPHEN WILLIAM TONKIN
BY
Cushman, Darby & Cushman
ATTORNEYS

DAMPERS FOR SPINNING BODIES

This invention relates to spinning bodies, e.g. spacecraft, and is concerned with means for damping the nutational movement of such bodies.

For certain spacecraft operations, it is necessary to maintain the spacecraft in a relatively stable and fixed attitude in space. This attitude may be maintained by rapidly rotating all, or part of, the craft about a fixed axis so as to provide a gyroscopic effect. This is known as spin stabilization. A spinning craft is subject to both precessional and nutational motions, and, in certain spacecraft, in particular those in which the spin moment of inertia of the craft is less than the moment of inertia of the craft about any axis other than the rotational axis, a nutational motion may result in the dissipation of energy in the spinning craft thereby causing the nutational motion to increase until the craft tumbles in flight. Spinning spacecraft therefore are normally provided with a nutation damper.

For a spacecraft having an oblate body, i.e. a body having a spinning inertia greater than its linear inertia, the flexibility of the structure will often give sufficient damping although occasionally it needs to be enhanced and it has been proposed to employ a nutation damper consisting of a mass placed in a damping fluid and attached to the craft through a spring suspension means, the damper being placed with the center of gravity of the mass along the spin axis of the craft.

For a spacecraft having a prolate body i.e. a body having a spinning inertia less than its linear inertia, it has been proposed to employ gas jet methods, or to fit a damper to a despun antenna platform, i.e. a platform which carries an antenna and either does not spin, or spins at a very slow rate such as one revolution per day, in order to maintain orientation relative to the earth.

The object of the present invention is to provide a nutation damper which will damp oblate and prolate spinning bodies such as spacecraft without the necessity for a despun mounting.

A further object of the present invention is to provide a nutation damper which does not need to be placed at the spinning axis of such spacecraft.

According to the present invention a nutation damper for mounting in a spinning spacecraft comprises an outer body adapted to be mounted fixedly on a spinning part of the spacecraft in a position which may be eccentric from the axis of spin of the spacecraft, a gyro flywheel mounted in the outer body for rotation about an axis parallel to the axis of spin, means for effecting high-speed rotation of the flywheel in and relatively to the outer body and in the opposite angular direction to the spin of the spacecraft, the flywheel mounting being constructed and arranged to permit relative tilting movements in any direction between the outer body and the rotating flywheel, and damping means for damping such relative tilting movements.

In one form of the invention, the flywheel comprises a rigid body surrounded by an inner housing mounted in the outer body by means of a mounting which prevents relative tilting movements between the housing and the outer body, and in which the housing contains a quantity of damping liquid which damps relative tilting movements between the flywheel and the housing.

For example the flywheel may be tiltably mounted by means of a universal joint mounting on a hub journalled in the outer body, and the inner housing is fixed to the hub for rotation therewith, and which includes motor means acting between the outer body and the hub to effect the high-speed rotation of the flywheel.

In another arrangement of the invention, in which a self-damping liquid flywheel is used, the flywheel comprises a quantity of free liquid, for example mercury, contained in the interior of an inner housing journalled in the outer body coaxially with the said axis parallel to the aforementioned axis of spin, and which includes motor means acting between the outer body and the inner housing for effecting the high-speed rotation of the inner housing in the angular direction opposite to the spin, the free liquid in the housing forming an annulus which is rotated at high speed by the frictional drag of the rotating housing and its volume being less than the total volume of the interior of the housing so that the rotating annulus of liquid which comprises the gyro flywheel has a self-damping action on tilting movements of the housing.

Preferably the outer body and/or the inner housing comprises a hermetically sealed casing containing an inert atmosphere.

The invention may be carried into practice in various ways but two specific embodiments will now be described by way of example with reference to the accompanying drawings, in which.

Figure 1:
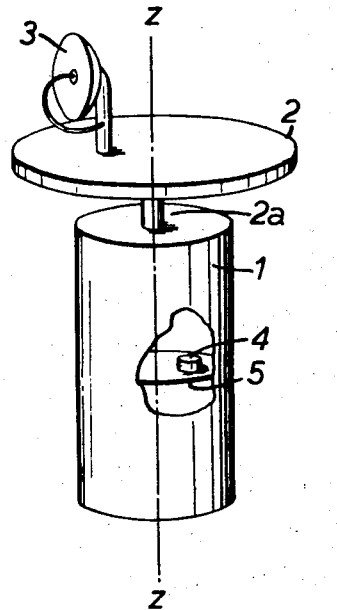
FIG. 1 is a schematic diagram of a spacecraft showing a nutation damper mounted upon it.

In a spacecraft of the type shown in FIG. 1, a body 1 rotating about a spin axis Z—Z supports a substantially non-rotating body 2, known as the despun platform, by means of a despun mounting 2a. Various instruments may be mounted of the despun platform 2, and a communications antenna 3 is shown as being typical of such instruments. A nutation damper 4 is fixedly mounted on a platform 5 within the rotating body 1, at a point spaced radially from the spin axis Z—Z.

Figure 2:
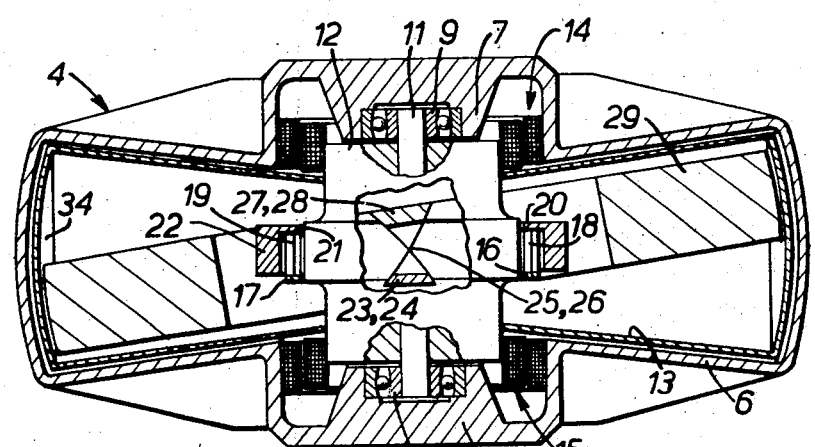
FIG. 2 is a diagrammatic part-sectioned view of one form of the nutation damper.

The nutation damper 4, which is shown in more detail in FIG. 2, comprises an outer case member 6 which is sealed and contains an inert atmosphere. A pair of bearing support members 7, 8 in the outer case member 6 contain bearings 9, 10 for rotatably supporting a spindle 11 which is fixed in the central hub portion 12 of an inner case member 13. A pair of electric motor units are located between the central boss portion 12 and the outer case member 6, the rotor portions 14 of the two motor units being fixed to the central hub portion 12, and the stator portions 15 being fixed to the outer case member 6. One motor is a high-power motor used solely for starting up the rotation of the flywheel 29 referred to below, and is switched off when the flywheel has reached spinning speed leaving the other motor energized to maintain the spinning of the flywheel at the desired speed. The inner case 13 is fixedly mounted on the hub 12 which is rotated together with the flywheel in a direction opposite to that in which the rotating body 1 is spinning. The axis of the bearings 9, 10 is parallel to and spaced from the spin axis Z—Z.

The central hub portion 12 is provided with a pair of diametrically-opposed, outwardly-extending arms 16, 17 which are connected through flexural pivots 18, 19 to a pair of diametrically-opposed, inwardly-directed arms 20, 21 extending from a gimbal ring 22. The gimbal ring has a further pair of diametrically-opposed arms 23, 24 (one only shown) outwardly directed and lying at 90° to the arms 20, 21. These arms 23, 24 are connected by flexural pivots 25, 26 to a pair of arms 27, 28 (only one shown) extending inwardly from an annular gyro flywheel 29 which lies concentrically within the inner case member 13.

Each of the flexible pivots 18, 19 and 25, 26 comprises a pair of oppositely-inclined, crossing, resilient strips of metal which are secured at their opposite ends to the associated parts which they couple together, but which are not connected together at their crossing point. The flexural pivots 18, 19 and 25, 26, and the gimbal ring 22 form a universal joint which enables the flywheel 29 to tilt relatively to the inner case 13, whilst transmitting the drive of the motors 14, 15 to the flywheel. The gimbal ring 22 is rotated with the flywheel.

A quantity of damping liquid 34 is provided in the inner case 13 to provide hydraulic damping of tilting movements of the inner case 13 relatively to the flywheel. Alternatively, some other damping arrangement may be used, for example, eddy current damping.

Thus it will be understood that the flywheel 29 being rotated at high speed, e.g. 30,000 r.p.m., provides a reaction member which is gyro-stabilized directionally, for use in damping tilting movements of the inner case 13 via the damping liquid, and hence for damping nutations of the outer body 6 and of the spinning part of the spacecraft to which it is fixed.

The general principles of operation of the nutation damper of FIGS. 1 to 3 will now be described.

When a body such as a spinning spacecraft is nutating, the angular velocity vector of the body itself may be on either side of the angular momentum vector, depending upon whether the body is prolate or oblate. If, however, the inner case 13 of the damper 4 mounted with its bearing axis on or radially spaced from the spacecraft axis of spin is spun at high speed together with the flywheel in the opposite direction to the spin of the spacecraft, its angular velocity vector is substantially parallel to the spacecraft spin axis but in the opposite direction (anti-parallel). Thus its angular velocity can be split into a steady component along the angular momentum vector and a normal component spinning around the angular vector at the nutation rate, always on the opposite side of the angular momentum vector to the s pin axis whether the body is prolate or oblate. The energy dissipating action of the damper produces a rotating torque opposite to the rotating angular velocity. This torque is in the correct direction to reduce nutation whether the body is prolate or oblate, provided that the flywheel is rotated in the opposite direction to the direction of spin.

It can be shown that for a given nutation angle the magnitude of the damping torque produced by such a damper is given approximately by the expression $$\text{DAMPING TORQUE} = (\theta . W_n . J . r'/2)$$

where $\theta$ is the nutation angle, and is small $W_n$ is the angular nutation rate, $J$ is the moment of inertia of the flywheel, and $r'$ is the angular velocity of the flywheel and where $r'$ is large and negative in relation to the rate of spin $r$ of the main body.

From this it can be seen that for a given flywheel inertia $J$, the damping produced is proportional to the speed of flywheel rotation $r'$ (negative with respect to the spin of the spacecraft). Thus the higher the value of $r'$ the lower the value of $J$ for corresponding damping torque, and consequently the less the weight of the damper required. It is also apparent that the damping torque produced is proportional to the angular momentum $J.r'$ of the flywheel. Thus to produce a given amount of damping the damper must subtract a corresponding amount of angular momentum from the spinning main body. To produce sufficient damping to counter the destabilising effect of energy dissipation in a prolate spinning body, a reduction of momentum of the body of about 5 percent may have to be accepted.

The rate of nutation reduction produced by the damper is given by the expression (Nutation decay time constant/Nutation period) = $(2.H/\pi.J.r')$ where $H$ is the original angular momentum of the spinning main body.

The nutation damper specifically described with reference to FIGS. 1 to 3 has various advantages over known forms of damper, for example, (a) where a conventional damper for a prolate body has to be mounted on a despun platform, the described damper, which is rotated at high speed (negative with respect to the main spinning body) needs no further despun platform, (b) because of the magnification of the damping effect proportional to speed, the overall mass and size of the described damper is less than that of a conventional damper, (c) whereas a conventional damper must be placed on the despun platform in a particular position, the described damper when rotated at high negative speed may be placed anywhere in the rotating body provided that its axis is parallel to the axis of the rotating body.

Figure 3:
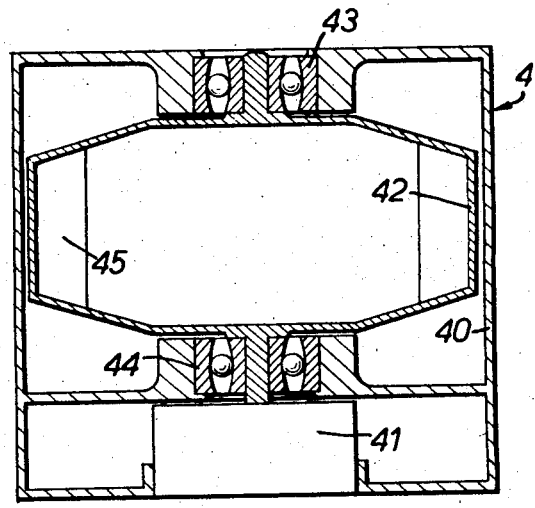
FIG. 3 is a diagrammatic part-sectional view of an alternative form of nutation damper.

In the alternative form of nutation damper shown in FIG. 3, an outer case 40 is sealed and contains an inert atmosphere. The outer case contains an A.C. electric motor 41 which drives a suitably-shaped inner case 42 which is rotatable in bearings 43, 44 in a direction opposite to that in which the outer casing of the nutation damper 4 and the spacecraft rotate. The axis of the bearings 43, 44 is parallel to and spaced from the spin axis of the spacecraft.

Within the inner case 42 is a predetermined volume of liquid mercury 45 which, when the inner case 42 is spinning, forms a flywheel (as shown in FIG. 3). Such a flywheel has self-damping properties and does not require a universal joint mounting such as is provided by the flexural pivots 18, 19, and 25, 26 of FIG. 2.

What we claim as our invention and desire to secure by Letters Patent is:

1. A nutation damper for mounting in a spinning spacecraft which comprises an outer body adapted to be mounted fixedly on a spinning part of the spacecraft, a gyro flywheel mounted in the outer body for rotation about an axis parallel to but spaced from the axis of spin, means for effecting high-speed rotation of the flywheel in and relatively to the outer body and in the angular direction opposite to the direction of spin, the flywheel mounting being constructed and arranged to permit relative tilting movements in any direction between the outer body and the rotating flywheel, and damping means for damping such relative tilting movements.

2. A nutation damper as claimed in claim 1 in which the flywheel is rigid and is surrounded by an inner housing mounted in the outer body by means of a mounting which prevents relative tilting movements between the housing and the outer body, and in which the housing contains a quantity of damping liquid which damps relative tilting movements between the flywheel and the housing.

3. A nutation damper as claimed in claim 2 in which the flywheel is tiltably mounted by means of a universal joint mounting on a hub journalled in the outer body, and the inner housing is fixed to the hub for rotation therewith, and which includes motor means acting between the outer body and the hub to effect the high-speed rotation of the flywheel.

4. A nutation damper as claimed in claim 3 in which the universal joint mounting comprises a gimbal mounting having a gimbal ring mounted to rotate with the flywheel.

5. A nutation damper as claimed in claim 4 in which the inner housing comprises a hermetically-sealed casing containing an inert atmosphere in addition to the liquid.

6. A nutation damper as claimed in claim 1 in which the flywheel comprises a quantity of free liquid contained in the annular interior of an inner housing journalled in the outer body coaxially with the said axis parallel to the axis of spin, and which includes motor means acting between the outer body and the inner housing for effecting the high-speed rotation of the inner housing, the free liquid in the housing forming an annulus which is rotated at high-speed by the frictional drag of the rotating housing and its volume being less than the total volume of the interior of the housing so that the rotating annulus of liquid which comprises the gyro flywheel has a self-damping action on tilting movements of the housing.

7. A nutation damper as claimed in claim 1 in which the outer body comprises a hermetically-sealed casing containing an inert atmosphere.

8. The combination of a spacecraft having an axis of spin, and a nutation damper mounted on the spacecraft, the nutation damper comprising an outer body fixedly mounted on a spun part of the spacecraft, a gyro flywheel mounted in the outer body for rotation about an axis parallel to but spaced from the axis of spin, means for effecting high-speed rotation of the flywheel in and relatively to the outer body and in the angular direction opposite to the direction of spin, the flywheel mounting being constructed and arranged to permit relative tilting movements in any direction between the outer body and the rotating flywheel, and damping means for damping such relative tilting movements.

9. The combination claimed in claim 8, in which the outer body of the damper is mounted eccentrically to the axis of spin of the spacecraft, with the axis of rotation of the flywheel spaced from the axis of spin.

10. The combination claimed in claim 8 in which the flywheel is rigid and is surrounded by an inner housing mounted in the outer body by means of a mounting which prevents relative tilting movements between the housing and the outer body, and in which the housing contains a quantity of damping liquid which damps relative tilting movements between the flywheel and the housing.

11. The combination claimed in claim 10 in which the flywheel is tiltably mounted by means of a universal joint mounting on a hub journalled in the outer body, and the inner housing is fixed to the hub for rotation therewith, and which includes motor means acting between the outer body and the hub to effect the high-speed rotation of the flywheel.

12. The combination claimed in claim 11 in which the universal joint mounting comprises a gimbal mounting having a gimbal ring mounted to rotate with the flywheel.

13. A combination claimed in claim 8 in which the flywheel comprises a quantity of free liquid contained in the annular interior of an inner housing journalled in the outer body coaxially with the said axis parallel to the axis of spin, and which includes motor means acting between the outer body and the inner housing for effecting the high-speed rotation of the inner housing, the free liquid in the housing forming an annulus which is rotated at high-speed by the frictional drag of the rotating housing and its volume being less than the total volume of the interior of the housing so that the rotating annulus of liquid which comprises the gyro flywheel has a self-damping action on tilting movements of the housing.

* * * * *

UNITED STATES PATENT OFFICE
CERTIFICATE OF CORRECTION

Patent No. 3,685,770        Dated August 22, 1972

Inventor(s) Stephen W. Tonkin

It is certified that error appears in the above-identified patent and that said Letters Patent are hereby corrected as shown below:

In the heading, line 30 was omitted and should appear as follows:

[30] Foreign Application Priority Data

March 5, 1970     Great Britain     10696/70
    April 7, 1970     Great Britain     16411/70

Signed and sealed this 15th day of May 1973.

(SEAL)
Attest:

EDWARD M. FLETCHER, JR.            ROBERT GOTTSCHALK
Attesting Officer                     Commissioner of Patents